(12) United States Patent
Schlueter

(10) Patent No.: US 8,263,721 B2
(45) Date of Patent: *Sep. 11, 2012

(54) OPHTHALMIC AND OTORHINOLARYNGOLOGICAL DEVICE MATERIALS

(75) Inventor: Douglas C. Schlueter, Azle, TX (US)

(73) Assignee: Novartis AG, Basel (CH)

( * ) Notice: Subject to any disclaimer, the term of this patent is extended or adjusted under 35 U.S.C. 154(b) by 273 days.

This patent is subject to a terminal disclaimer.

(21) Appl. No.: 12/417,331

(22) Filed: Apr. 2, 2009

(65) Prior Publication Data

US 2009/0198327 A1 Aug. 6, 2009

Related U.S. Application Data

(63) Continuation-in-part of application No. 11/451,117, filed on Jun. 12, 2006, now abandoned.

(60) Provisional application No. 60/689,999, filed on Jun. 13, 2005.

(51) Int. Cl.
*A61F 2/16* (2006.01)
*A61F 2/02* (2006.01)
*G02B 1/04* (2006.01)
*G02C 7/04* (2006.01)
*C08F 220/18* (2006.01)
*C08F 220/20* (2006.01)

(52) U.S. Cl. ............ 526/318.44; 523/106; 523/113; 351/160 R; 351/162; 351/163; 424/429; 623/5.12; 623/6.11; 623/10; 526/329.2

(58) Field of Classification Search ............ 526/318.44, 526/329.2; 523/106, 113; 351/160 R, 162, 351/163; 424/429; 623/5.12, 6.11, 10
See application file for complete search history.

(56) References Cited

U.S. PATENT DOCUMENTS

| | | |
|---|---|---|
| 3,390,206 A | 6/1968 | Thompson |
| 3,842,059 A | 10/1974 | Milkovich et al. |
| 3,862,077 A | 1/1975 | Schultz et al. |
| 4,085,168 A | 4/1978 | Milkovich et al. |
| 5,057,366 A | 10/1991 | Husman et al. |
| 5,278,244 A | 1/1994 | Babu |
| 5,290,892 A | 3/1994 | Namdaran et al. |
| 5,331,073 A | 7/1994 | Weinschenk, III et al. |
| 5,470,932 A | 11/1995 | Jinkerson |
| 5,693,095 A | 12/1997 | Freeman et al. |
| 5,708,094 A | 1/1998 | Lai et al. |
| 5,763,548 A | 6/1998 | Matyjaszewski et al. |
| 5,789,487 A | 8/1998 | Matyjaszewski et al. |
| 5,852,129 A | 12/1998 | Kusakabe et al. |
| 6,083,856 A | 7/2000 | Joseph et al. |
| 6,174,546 B1 | 1/2001 | Therriault et al. |
| 6,353,069 B1 | 3/2002 | Freeman et al. |
| 6,737,496 B2 | 5/2004 | Hodd et al. |
| 6,806,337 B2 | 10/2004 | Schlueter et al. |
| 6,872,793 B1 | 3/2005 | Schlueter et al. |
| 7,714,039 B2 * | 5/2010 | Cordova et al. ............ 523/106 |
| 2003/0013825 A1 | 1/2003 | Grubbs et al. |
| 2003/0176521 A1 | 9/2003 | Jethmalani et al. |
| 2003/0198825 A1 | 10/2003 | Mayes et al. |
| 2006/0281888 A1 * | 12/2006 | Schlueter ............ 526/318.44 |

FOREIGN PATENT DOCUMENTS

| | | |
|---|---|---|
| GB | 1096912 | 12/1997 |
| GB | 2338958 | 1/2000 |
| WO | 03040154 | 5/2003 |
| WO | 2006138188 | 12/2006 |

OTHER PUBLICATIONS

Boonstra, "Role of particulate fillers in elastomer reinforcement: a review," Polymer, vol. 20, pp. 691-704 (1979).
Bryant et al., "Synthesis and Characterization of Photopolymerized Multifunctional Hydrogels: Water-Soluble (Vinyl Alcohol) and Chondroitin Sulfate Macromers for Chondrocyte Encapsulation," Macromolecules, vol. 37, pp. 6726-6733 (2004).
Gu et al., "Preparation of High Strength and Optically Transparent Silicone Rubber," European Polymer Journal, vol. 34(1), pp. 1727-1733 (1998).
Henschke et al., "Metallocene-Catalyzed Copolymerization of Propene with Polystyrene Macromonomers," Macromolecules, vol. 30 (26), pp. 8097-8100 (1997).
Ito., "Polymeric Design by Macromonomer Technique," Prof. Polymer Science, vol. 23, pp. 581-620 (1998).
Kennedy, "New Biomaterials by Carbocationic Processes," Macromol. Symp., vol. 85, pp. 79-96 (1994).
PCT International Search Report for corresponding International Application No. PCT/US06/22691 with mailing date Oct. 25, 2006.
Schulz et al., "Graft Polymers with Macromonomers. I. Synthesis from Methacrylate-Terminated Polystyrene," J. of Applied Polymer Science, vol. 27, pp. 4773-4786 (1982).
Schulz et al., "Graft Polymers with Macromonomers. II. Copolymerization Kinetics of Methacrylate-Terminated Polystyrene and Predicted Graft Copolymer Structures," J. of Polymer ScienceI, vol. 22, pp. 1633-1652 (1984).

* cited by examiner

*Primary Examiner* — Michael Pepitone
(74) *Attorney, Agent, or Firm* — Scott A. Chapple

(57) ABSTRACT

Disclosed are soft, high refractive index device materials having improved strength. The materials contain a polystyrene macromer.

17 Claims, No Drawings

OPHTHALMIC AND OTORHINOLARYNGOLOGICAL DEVICE MATERIALS

This application is a continuation-in-part (CIP) of U.S. application Ser. No. 11/451,117 (now abandoned), filed Jun. 12, 2006, priority of which is claimed under 35 U.S.C. §120, the contents of which are incorporated herein by reference. This application also claims priority under 35 U.S.C. §119 to U.S. Provisional Application, Ser. No. 60/689,999, filed Jun. 13, 2005, the contents of which are incorporated herein by reference.

FIELD OF THE INVENTION

This invention is directed to improved ophthalmic and otorhinolaryngological device materials. In particular, this invention relates to soft, high refractive index acrylic device materials that have improved strength.

BACKGROUND OF THE INVENTION

With the recent advances in small-incision cataract surgery, increased emphasis has been placed on developing soft, foldable materials suitable for use in artificial lenses. In general, these materials fall into one of three categories: hydrogels, silicones, and acrylics.

In general, hydrogel materials have a relatively low refractive index, making them less desirable than other materials because of the thicker lens optic necessary to achieve a given refractive power. Silicone materials generally have a higher refractive index than hydrogels, but tend to unfold explosively after being placed in the eye in a folded position. Explosive unfolding can potentially damage the corneal endothelium and/or rupture the natural lens capsule. Acrylic materials are desirable because they typically have a high refractive index and unfold more slowly or controllably than silicone materials.

U.S. Pat. No. 5,290,892 discloses high refractive index, acrylic materials suitable for use as an intraocular lens ("IOL") material. These acrylic materials contain, as principal components, two aryl acrylic monomers. The IOLs made of these acrylic materials can be rolled or folded for insertion through small incisions.

U.S. Pat. No. 5,331,073 also discloses soft acrylic IOL materials. These materials contain as principal components, two acrylic monomers which are defined by the properties of their respective homopolymers. The first monomer is defined as one in which its homopolymer has a refractive index of at least about 1.50. The second monomer is defined as one in which its homopolymer has a glass transition temperature less than about 22° C. These IOL materials also contain a cross-linking component. Additionally, these materials may optionally contain a fourth constituent, different from the first three constituents, which is derived from a hydrophilic monomer. These materials preferably have a total of less than about 15% by weight of a hydrophilic component.

U.S. Pat. No. 5,693,095 discloses foldable, high refractive index ophthalmic lens materials containing at least about 90 wt. % of only two principal components: one aryl acrylic hydrophobic monomer and one hydrophilic monomer. The aryl acrylic hydrophobic monomer has the formula

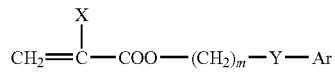

wherein: X is H or $CH_3$;
m is 0-6;
Y is nothing, O, S, or NR, wherein R is H, $CH_3$, $C_nH_{2n+1}$ (n=1-10), iso-$OC_3H_7$, $C_6H_5$, or $CH_2C_6H_5$; and
Ar is any aromatic ring which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$.

The lens materials described in the '095 patent preferably have a glass-transition temperature ("$T_g$") between about −20 and +25° C.

Flexible intraocular lenses may be folded and inserted through a small incision. In general, a softer material may be deformed to a greater extent so that it can be inserted through an increasingly smaller incision. Soft acrylic or methacrylic materials typically do not have an appropriate combination of strength, flexibility and non-tacky surface properties to permit IOLs to be inserted through an incision as small as that required for silicone IOLs. The mechanical properties of silicone elastomers are improved by addition of an inorganic filler, typically surface treated silica. Surface treated silica improves the mechanical properties of soft acrylic rubbers, too, but reduces the optical clarity of the finished product. Alternative filler materials having a refractive index closer to soft acrylic rubber are needed.

The addition of reinforcing fillers to soft polymers is known to improve tensile strength and tear resistance. Reinforcement stiffens the polymer and improves its toughness by restricting the local freedom of movement of polymer chains, and strengthens the structure by introducing a network of weak fix points. The reinforcing ability of a particular filler depends upon its characteristics (e.g. size and surface chemistry), the type of elastomer with which it is used, and the amount of filler present. Conventional fillers include carbon black and silicate fillers, where the particle size (for maximum surface area) and wettability (for strength of cohesion) are of primary importance. Covalent chemical bonding between the matrix and the filler is generally not required for effective reinforcement. For a recent application and review see: Boonstra, "Role of particulate fillers in elastomer reinforcement: a review" *Polymer* 1979, 20, 691, and Gu, et al., "Preparation of high strength and optically transparent silicone rubber" *Eur. Polym. J.* 1998, 34, 1727.

SUMMARY OF THE INVENTION

Improved soft, foldable acrylic device materials which are particularly suited for use as IOLs, but which are also useful as other ophthalmic or otorhinolaryngological devices, such as contact lenses, keratoprostheses, corneal rings or inlays, otological ventilation tubes and nasal implants, have been discovered. These polymeric materials contain microphase-separated domains similar to that found in conventional block copolymers. The presence of the microphase-separated domains improves the strength and influences the surface properties of the polymeric materials without need for added filler materials. The properties of the materials of the present invention are different than statistical (random) copolymers with identical feed ratios.

DETAILED DESCRIPTION OF THE INVENTION

Unless indicated otherwise, all component amounts are presented on a % (w/w) basis ("wt. %").

The device materials of the present invention are self-reinforced polymeric materials. The materials are made by the polymerization of a) a monofunctional acrylate or methacrylate monomer [1], b) a difunctional acrylate or methacrylate cross-linker [2], and c) an acrylate or methacrylate terminated polystyrene [3] or a diacrylate or dimethacrylate terminated polystyrene [4].

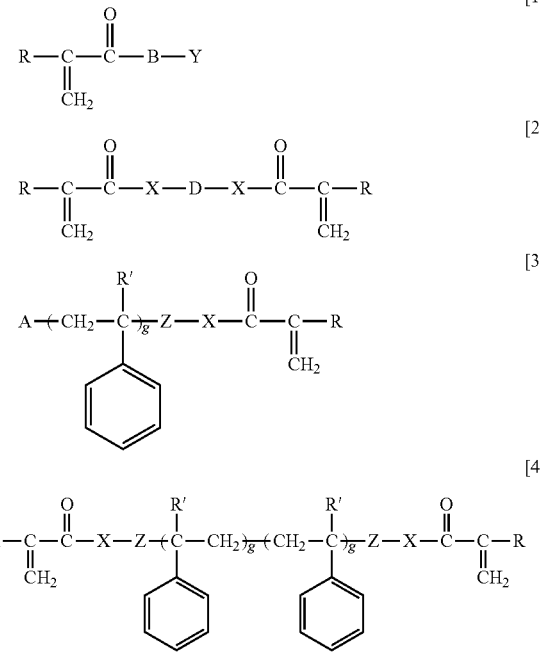

wherein
R, R' independently=H, CH$_3$, or CH$_2$CH$_3$;
B=O(CH$_2$)$_n$, NH(CH$_2$)$_n$, or NCH$_3$(CH$_2$)$_n$;
X=O(CH$_2$)$_n$, NH(CH$_2$)$_n$, NCH$_3$(CH$_2$)$_n$, or nothing;
n=0-6;
Y=phenyl, (CH$_2$)$_m$H, (CH$_2$)$_m$C$_6$H$_5$, OH, CH$_2$CH(OH)CH$_2$OH, (OCH$_2$CH$_2$)$_m$OCH$_3$, or (OCH$_2$CH$_2$)$_m$OCH$_2$CH$_3$;
m=0-12;
Z=(CH$_2$)$_a$, (CH$_2$CH$_2$O)$_b$, O, or nothing;
D=(CH$_2$)$_a$, O(CH$_2$CH$_2$O)$_b$, O, or nothing;
g is at least 2;
a=1-12;
b=1-24; and
A=CH$_3$—, CH$_3$CH$_2$—, CH$_3$CH$_2$CH$_2$—, CH$_3$CH$_2$CH$_2$CH$_2$—, or CH$_3$CH$_2$CH(CH$_3$)—.

Preferred monomers of formula (1) are those wherein:
R=H, B=O(CH$_2$)$_2$, Y=phenyl;
R=H, B=O(CH$_2$)$_3$, Y=phenyl;
R=CH$_3$, B=O(CH$_2$)$_4$, Y=phenyl; and
g is at least 10.

Preferred monomers of formula (2) are those wherein:
R=H, X=OCH$_2$, D=(CH$_2$)$_2$,
R=CH$_3$, X=OCH$_2$, D=nothing; and
R=CH$_3$, X=nothing, D=O(CH$_2$CH$_2$O)$_b$, where b>10.

Preferred macromers of formula (3) are those wherein:
R=CH$_3$, R'=H, X=O(CH$_2$)$_2$, Z=nothing, A=CH$_3$CH$_2$CH(CH$_3$); and
R=CH$_3$, R'=CH$_3$, X=O(CH$_2$)$_2$, Z=nothing, A=CH$_3$CH$_2$CH(CH$_3$).

Preferred macromers of formula (4) are those wherein:
R=CH$_3$, R'=H, X=O(CH$_2$)$_2$, Z=nothing, A=CH$_3$CH$_2$CH(CH$_3$); and
R=CH$_3$, R'=CH$_3$, X=O(CH$_2$)$_2$, Z=nothing, A=CH$_3$CH$_2$CH(CH$_3$).

Monomers of formula (1) are known and can be made by known methods. See, for example, U.S. Pat. Nos. 5,331,073 and 5,290,892. Many monomers of formula (1) are commercially available from a variety of sources.

Monomers of formula (2) are known and can be made by known methods, and are commercially available. Preferred monomers of formula (2) include ethylene glycol dimethacrylate; diethylene glycol dimethacrylate; 1,6-hexanediol dimethacrylate; 1,4-butanediol dimethacrylate; poly(ethylene oxide)dimethacrylate (number average molecular weight 600-1000); and their corresponding acrylates.

Macromers of formulas (3) and (4) are known. They are commercially available in some instances and can be made by known methods. Macromers of formulas (3) and (4) can be made by covalently attaching a polymerizable group to a functional end group of a linear or branched polystyrene. For example, hydroxyl terminated polystyrene may be synthesized by anionic polymerization of styrene, then functionalized by termination with ethylene oxide to produce hydroxyl terminated polystyrene. The terminal hydroxyl groups are end-capped on one or both terminal chain ends with an acrylate, methacrylate or styrenic group. The end-caps are covalently attached via known methods, for example esterification with methacryloyl chloride or reaction with an isocyanate to form a carbamate linkage. See, generally, U.S. Pat. Nos. 3,862,077 and 3,842,059, the entire contents of which are incorporated by reference.

Alternatively, macromers of formula (3) and (4) can also be prepared using atom transfer radical polymerization (ATRP) conditions. For example, a hydroxyl terminal initiator (hydroxyethyl bromoisobutyrate) can combined with copper(I) halide and a solubilizing amine ligand. This can be used to initiate the polymerization of styrene monomer under suitable conditions. See, generally, U.S. Pat. Nos. 5,852,129, 5,763,548, and 5,789,487. The resulting hydroxyl terminated poly(styrene) can then be reacted with methacryloyl chloride or isocyanatoethyl methacrylate to produce a methacrylate terminated macromonomer.

The flexibility of the copolymeric material of the present invention depends primarily on the glass transition temperature of the homopolymer formed from monomer (1) and the miscibility of the polystyrene macromer in the resulting polymer network. The concentration of monomer (1) is typically at least 50%, and preferably 65-85 wt %, of the total (monomer+macromer+cross-linker) concentration. The difunctional cross-linker (2) concentration is typically 10 to 15 wt % of the total concentration when R=CH$_3$, X=nothing, D=O(CH$_2$CH$_2$O)$_b$, where b>5, and preferably less than about 3 wt % for lower molecular weight difunctional cross-linkers, for example when R=H, X=OCH$_2$, and D=(CH$_2$)$_2$. The total concentration of macromers (3) and (4) depends on the glass transition temperature of the homopolymer formed from monomer (1). Macromers (3) and (4) will tend to increase the modulus and decrease the flexibility of the resulting copolymeric material as a function of their molecular weight. At lower molecular weight, the macromers (3) and (4) may be miscible with the resulting polymer network and the effect on T$_g$ will be more like a conventional copolymer. At higher molecular weight or higher total macromer concentration, increased phase separation may occur and allow a distinct polystyrene macromer phase and two T$_g$'s. The total concentration of macromers (3) and (4) in the copolymeric material of the present invention typically is between 5-40 wt %.

The copolymer clarity is dependent on total macromer concentration and macromer molecular weight in the phenylethylacrylate copolymer series. Phenylethyl acrylate copolymers containing 20 wt % polystyrene macromer with a number average molecular weight ($M_n$) of approximately 51,000 and polydispersity of less than about 1.03 were not optically clear. Copolymers containing lower molecular weight narrow polydispersity polystyrene macromer exhibited excellent optical clarity. Accordingly, the copolymeric materials of the present invention preferably contain macromers (3) or (4) having a $M_n$ less than 51,000.

The copolymeric device material of the present invention optionally contains one or more ingredients selected from the group consisting of a polymerizable UV absorber and a polymerizable colorant. Preferably, the device material of the present invention contains no other ingredients besides the monomers of formulas (1) and (2), the macromers (3) and/or (4), and polymerizable UV absorbers and colorants.

The device material of the present invention optionally contains reactive UV absorbers or reactive colorants. A preferred reactive UV absorber is 2-(2'-hydroxy-3'-methallyl-5'-methylphenyl)benzotriazole, commercially available as o-Methallyl Tinuvin P ("oMTP") from Polysciences, Inc., Warrington, Pa. UV absorbers are typically present in an amount from about 0.1-5% (weight). Suitable reactive bluelight absorbing compounds include those described in U.S. Pat. No. 5,470,932. Blue-light absorbers are typically present in an amount from about 0.01-0.5% (weight). When used to make IOLs, the device materials of the present invention preferably contain both a reactive UV absorber and a reactive colorant.

In order to form the device material of the present invention, the chosen ingredients (1), (2), and either (3) or (4) or both (3) and (4) are combined and polymerized using a radical initiator to initiate polymerization by the action of either heat or radiation. The device material is preferably polymerized in de-gassed polypropylene molds under nitrogen or in glass molds.

Suitable polymerization initiators include thermal initiators and photoinitiators. Preferred thermal initiators include peroxy free-radical initiators, such as t-butyl (peroxy-2-ethyl) hexanoate and di-(tert-butylcyclohexyl) peroxydicarbonate (commercially available as Perkadox® 16 from Akzo Chemicals Inc., Chicago, Ill.). Particularly in cases where the materials of the present invention do not contain a blue-light absorbing chromophore, preferred photoinitiators include benzoylphosphine oxide initiators, such as 2,4,6-trimethylbenzoyldiphenyl-phosphine oxide, commercially available as Lucirin® TPO from BASF Corporation (Charlotte, N.C.). Initiators are typically present in an amount equal to about 5% or less of the total formulation weight, and more preferably less than 2% of the total formulation. As is customary for purposes of calculating component amounts, the initiator weight is not included in the formulation weight % calculation.

The particular combination of the ingredients described above and the identity and amount of any additional components are determined by the desired properties of the finished device material. In a preferred embodiment, the device materials of the present invention are used to make IOLs having an optic diameter of 5.5 or 6 mm that are designed to be compressed or stretched and inserted through surgical incision sizes of 2 mm or less.

The device material preferably has a refractive index in the dry state of at least about 1.47, and more preferably at least about 1.50, as measured by an Abbe' refractometer at 589 nm (Na light source) and 25° C. Optics made from materials having a refractive index lower than 1.47 are necessarily thicker than optics of the same power which are made from materials having a higher refractive index. As such, IOL optics made from materials with comparable mechanical properties and a refractive index lower than about 1.47 generally require relatively larger incisions for IOL implantation.

The material morphology or phase structure will depend on the macromer concentration, molecular weight, it's miscibility in the copolymer network (which also depends on molecular weight), and the polymerization method. The microphase separated behavior can be observed by differential scanning calorimetry (DSC). Microphase-separated materials will exhibit two glass-transition temperatures ("$T_g$"). The continuous phase and non-continuous phase will each exhibit a separate $T_g$. $T_g$ of the continuous phase will primarily determine the material's flexibility properties, and folding and unfolding characteristics, and is preferably less than about +25° C., and more preferably less than about 0° C. $T_g$ of the non-continuous phase has a lesser impact on the materials' flexibility than that of the continuous phase. $T_g$ is measured by differential scanning calorimetry at 10° C./min., and is generally determined at the midpoint of the transition of the heat flux versus temperature curve.

The device material preferably has an elongation of at least 150%, more preferably at least 300%, and a Young's modulus of less than 6.0 MPa, more preferably less than 5.0 MPa. These properties indicate that a lens made from such material generally will fold easily and will not crack, tear or split when it is folded. Tensile properties of polymer samples are determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at standard laboratory conditions of 23±2° C. and 50±5% relative humidity using an Instron Material Tester model 4400 with a 50 N load cell. The grip distance is 14 mm and a crosshead speed is 500 mm/minute and the sample is pulled to failure. The elongation (strain) is reported as a fraction of the displacement at failure to the original grip distance ("Elongation" or "Strain at break"). The modulus is calculated as the instantaneous slope of the stress-strain curve at 0% strain ("Young's modulus"), 25% strain ("25% modulus") and 100% strain ("100% modulus). Tear resistance was measured on unnicked 90° C. angle specimens (Die C) according to ASTM D624-91 "Standard Test Method for Tear Strength of Conventional Vulcanized Rubber and Thermoplastic Elastomers". The test specimens were 20 mm total length, 9.0 mm gauge length and a thickness of 0.9 mm. Testing was performed on samples at standard laboratory conditions of 23±2° C. using an Instron Material Tester model 4400 with a 50 N load cell. The grip distance was 9.0 mm and the crosshead speed was 500 mm/minute and the sample was pulled to failure. The tear resistance ("Tear strength") was calculated from the maximum force obtained during testing divided by the sample thickness.

IOLs constructed of the device materials of the present invention can be of any design capable of being stretched or compressed into a small cross section that can fit through a 2-mm incision. For example, the IOLs can be of what is known as a one-piece or multi-piece design, and comprise optic and haptic components. The optic is that portion which serves as the lens and the haptics are attached to the optic and are like arms that hold the optic in its proper place in the eye. The optic and haptic(s) can be of the same or different material. A multi-piece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the materials of the present invention are also suitable for use as other ophthalmic or otorhinolaryngological devices such as contact lenses, keratoprostheses, corneal inlays or rings, otological ventilation tubes and nasal implants.

The invention will be further illustrated by the following examples, which are intended to be illustrative, but not limiting.

EXAMPLE 1

Thermally Initiated Copolymerization of Methacrylate Terminated poly(styrene) with 2-phenylethyl Acrylate and 1,4-butanediol Diacrylate A 20-mL scintillation vial was charged with 1.3999 g of methacrylate terminated poly(styrene), 5.6535 g of 2-phenylethyl acrylate (PEA), and 0.0347 g of 1,4-butanediol diacrylate (BDDA). The vial was closed and agitated for about 1 hr to allow the polystyrene component to dissolve. The monomer mixture was filtered through a 1.0-micron glass fiber membrane, then through a 0.45-micron PTFE filter. The formulation was de-gassed by bubbling $N_2$ through the monomer mixture. t-Butyl peroxy-2-ethylhexanoate (t-BPO) was added (0.0601 g) and the solution was mixed thoroughly. The monomer mixture was dispensed into vacuum de-gassed polypropylene molds under a $N_2$ atmosphere. The filled molds were then placed in a mechanical convection oven and cured at 70° C. for 1 hr, then post-cured for 2 hrs at 110° C. The product was removed from the polypropylene molds and the residual monomer was removed by acetone extraction at room temperature. The extracted polymer was dried under vacuum at 60° C. The percent acetone extractables was determined gravimetrically. Representative properties are listed in Table 1.

EXAMPLE 2

Thermally Initiated Copolymerization of Styrene with 2-phenylethyl Acrylate and 1,4-butanediol Diacrylate A 20-mL scintillation vial was charged with 2.0096 g of styrene, 7.9588 g of 2-phenylethyl acrylate (PEA), and 0.0565 g of 1,4-butanediol diacrylate (BDDA). The monomer mixture was mixed then filtered through a 0.45-micron PTFE filter. The formulation was de-gassed by bubbling $N_2$ through the monomer mixture. t-Butyl peroxy-2-ethylhexanoate (t-BPO) was added (0.1050 g) and the solution was mixed thoroughly. The monomer mixture was dispensed into vacuum de-gassed polypropylene molds. The filled molds were then placed in a mechanical convection oven and cured at 70° C. for 1 hr, then post-cured for 2 hrs at 110° C. The product was removed from the polypropylene molds and the residual monomer was removed by acetone extraction at room temperature as indicated in Ex. 1. Representative properties are listed in Table 1.

TABLE 1

Comparison of methacrylate terminated poly(styrene) graft copolymer with 2-phenylethyl acrylate and poly(styrene-co-2-phenylethyl acrylate)

| Example | 1 | 2 |
|---|---|---|
| PEA (wt %) | 79.76 | 79.39 |
| Styrene (wt %) | — | 20.05 |
| Poly(styrene)MA (wt %) | 19.74 | — |
| Poly(styrene)MA $M_n$ | 13,000 | — |
| % BDDA | 0.49 | 0.56 |
| Initiator | t-BPO | t-BPO |
| Initiator (wt %) | 0.85 | 1.05 |
| Refractive index (25° C.) | 1.5617 ± 0.0003 | 1.5605 ± 0.0007 |
| Tensile strength (MPa) | 8.62 ± 0.79 | 3.81 ± 0.73 |
| Strain at break (%) | 957 ± 65 | 783 ± 150 |
| Young's modulus | 3.23 ± 0.49 | 6.02 ± 2.14 |
| 25% modulus | 2.61 ± 0.52 | 6.73 ± 2.08 |
| 100% modulus | 1.68 ± 0.11 | 2.12 ± 0.49 |
| Tear resistance (N/mm) | 6.20 ± 0.87 | 4.54 ± 0.67 |

EXAMPLE 3

UV Initiated Copolymerization of Methacrylate Terminated poly(styrene) ($M_n$ 13,000) with 2-phenylethyl Acrylate and 1,4-butanediol Diacrylate A 20-mL scintillation vial was charged with 2.0045 g of methacrylate-terminated polystyrene ($M_n$ 13,000), 7.9528 g of 2-phenylethyl acrylate (PEA), and 0.0519 g of 1,4-butanediol diacrylate (BDDA). The vial was closed and the mixture was agitated for about 1 hr to allow the polystyrene component to dissolve. 2-Hydroxy-2-methyl-1-phenyl-propane-1-one (Darocur® 1173) was added (0.1050 g) and the solution was mixed thoroughly. The monomer mixture was filtered through a 1.0-micron glass fiber membrane, then a 0.45-micron PTFE membrane filter. The formulation was de-gassed by $N_2$ bubbling then dispensed into vacuum de-gassed polypropylene molds under a $N_2$ atmosphere. The filled molds were exposed to UV light for 20 min. The product was removed from the polypropylene molds and the residual monomer was removed by acetone extraction at room temperature as indicated in Ex. 1. Representative properties are listed in Table 2.

EXAMPLE 4

UV Initiated Copolymerization of Methacrylate Terminated poly(styrene) ($M_n$ 23,300) with 2-phenylethyl Acrylate and 1,4-butanediol Diacrylate A 20-mL scintillation vial was charged with 0.6002 g of methacrylate-terminated polystyrene ($M_n$ 23,300), 2.3937 g of 2-phenylethyl acrylate (PEA), and 0.0172 g of 1,4-butanediol diacrylate (BDDA). The vial was closed and the mixture was agitated for about 1 hr to allow the polystyrene component to dissolve. 2-Hydroxy-2-methyl-1-phenyl-propane-1-one (Darocur®1173) was added (0.0323 g) and the solution was mixed thoroughly. The monomer mixture was filtered through a 1.0-micron glass fiber membrane filter. The formulation was de-gassed by $N_2$ bubbling then dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 2.

EXAMPLE 5

UV Initiated Copolymerization of Methacrylate Terminated poly(styrene) ($M_n$ 51,000) with 2-phenylethyl Acrylate and 1,4-butanediol Diacrylate A 20-mL scintillation vial was charged with 1.0002 g of methacrylate-terminated polystyrene ($M_n$ 51,000), 3.9897 g of 2-phenylethyl acrylate (PEA), and 0.0289 g of 1,4-butanediol diacrylate (BDDA). The vial was closed and the mixture was agitated for about 1 hr to allow the polystyrene component to dissolve. 2-Hydroxy-2-methyl-1-phenyl-propane-1-one (Darocur® 1173) was added (0.0518 g) and the solution was mixed thoroughly. The monomer mixture was filtered through a 1.0-micron glass fiber membrane filter. The formulation was de-gassed by $N_2$ bubbling then dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 2.

EXAMPLE 7

UV Initiated Copolymerization of Dimethacrylate Terminated poly(styrene) with 2-phenylethyl Acrylate and 1,4-butanediol Diacrylate A 20-mL scintillation vial was charged with 0.6015 g of dimethacrylate-terminated polystyrene, 2.3960 g of 2-phenylethyl acrylate (PEA), and 0.0164 g of 1,4-butanediol diacrylate (BDDA). The vial was closed and the mixture was agitated for about 1 hr to allow the polystyrene component to dissolve. The monomer mixture was filtered through a 1.0-micron glass fiber membrane filter, and de-gassed by $N_2$ bubbling. 2-Hydroxy-2-methyl-1-phenyl-propane-1-one (Darocur® 1173) was added (0.0310 g) and the solution was mixed thoroughly. The monomer mixture was dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 2.

TABLE 2

Methacrylate and dimethacrylate terminated poly(styrene) copolymers with 2-phenylethyl acrylate and 1,4-butanediol diacrylate

| Example | 3 | 4 | 5 | 6 | 7 |
|---|---|---|---|---|---|
| PEA (wt %) | 79.45 | 79.50 | 79.50 | 80.09 | 79.50 |
| Poly(styrene)MA (wt %) | 20.03 | 19.93 | 19.93 | — | — |
| Poly(styrene)MA $M_n$ | 13,000 | 23,300 | 51,000 | — | — |
| Poly(styrene)DMA (wt %) | — | −7 | — | 19.91 | 19.96 |
| Poly(styrene)DMA $M_n$ | — | — | — | 6,200 | 6,200 |
| % BDDA | 0.52 | 0.57 | 0.57 | — | 0.54 |
| Initiator | Darocur ® 1173 | Darocur ® 1173 | Darocur ® 1173 | Darocur ® 1173 | Darocur ® 1173 |
| Initiator (wt %) | 1.02 | 1.07 | 1.03 | 0.94 | 1.03 |
| Refractive index (25° C.) | 1.5616 ± 0.0009 | 1.5632 ± 0.0003 | 1.5615 ± 0.0005 | 1.5613 ± 0.0008 | 1.5602 ± 0.0006 |
| Tensile strength (MPa) | 5.62 ± 0.84 | 9.85 ± 0.78 | 9.33 ± 0.13 | 8.25 ± 0.91 | 7.91 ± 0.93 |
| Strain at break (%) | 918 ± 90 | 792 ± 63 | 642 ± 23 | 1084 ± 107 | 774 ± 63 |
| Young's modulus | 1.28 ± 0.18 | 2.23 ± 0.21 | 4.23 ± 0.52 | 4.38 ± 0.52 | 4.93 ± 0.80 |
| 25% modulus | 1.09 ± 0.25 | 1.52 ± 0.21 | 2.03 ± 0.50 | 4.53 ± 0.45 | 4.91 ± 1.31 |
| 100% modulus | 0.84 ± 0.03 | 1.46 ± 0.05 | 2.50 ± 0.08 | 2.23 ± 0.16 | 2.57 ± 0.45 |
| Tear resistance (N/mm) | 3.99 ± 0.18 | 7.08 ± 1.50 | 6.26 ± 0.98 | 3.85 ± 0.27 | 3.74 ± 0.33 |
| $T_g$ (° C.) | 1 | −1, 90 | −2, 102 | — | — |
| Appearance | clear | clear | hazy | clear | clear |

EXAMPLE 6

UV Initiated Copolymerization of Dimethacrylate Terminated poly(styrene) with 2-phenylethyl Acrylate A 20-mL scintillation vial was charged with 0.6005 g of dimethacrylate-terminated polystyrene, and 2.4159 g of 2-phenylethyl acrylate (PEA). The vial was closed and the mixture was agitated for about 1 hr to allow the polystyrene component to dissolve. The monomer mixture was filtered through a 1.0-micron glass fiber membrane filter, and de-gassed by $N_2$ bubbling. 2-Hydroxy-2-methyl-1-phenyl-propane-1-one (Darocur® 1173) was added (0.0285 g) and the solution was mixed thoroughly. The monomer mixture was dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 2.

EXAMPLE 8

UV Initiated Copolymerization of Methacrylate Terminated poly(styrene) with 2-phenylethyl Acrylate and 1 wt % 1,4-butanediol Diacrylate A 20-mL scintillation vial was charged with 1.2005 g of methacrylate-terminated polystyrene, 4.7472 g of 2-phenylethyl acrylate (PEA), and 0.0597 g of 1,4-butanediol diacrylate (BDDA). The vial was closed and the mixture was agitated for about 1 hr to allow the polystyrene component to dissolve. The monomer mixture was filtered using a 1.0-micron glass fiber membrane filter, then through a 0.45-micron PTFE membrane filter, and de-gassed by $N_2$ bubbling. 2-Hydroxy-2-methyl-1-phenyl-propane-1-one (Darocur® 1173) was added (0.0581 g) and the solution was mixed thoroughly. The monomer mixture was dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 3.

EXAMPLE 9

UV Initiated Copolymerization of Methacrylate Terminated poly(styrene) with 2-phenylethyl Acrylate and 2 wt % 1,4-butanediol Diacrylate A 20-mL scintillation vial was charged with 1.2008 g of methacrylate-terminated polystyrene, 4.6929 g of 2-phenylethyl acrylate (PEA), and 0.1225 g of 1,4-butanediol diacrylate (BDDA). The vial was closed and the mixture was agitated for about 1 hr to allow the polystyrene component to dissolve. The monomer mixture was filtered using a 1.0-micron glass fiber membrane filter, then through a 0.45-micron PTFE membrane filter, and de-gassed by $N_2$ bubbling. 2-Hydroxy-2-methyl-1-phenyl-propane-1-one (Darocur® 1173) was added (0.0561 g) and the solution was mixed thoroughly. The monomer mixture was dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 3.

EXAMPLE 10

UV Initiated Copolymerization of Methacrylate Terminated poly(styrene) with 2-phenylethyl Acrylate and 3 wt % 1,4-butanediol Diacrylate A 20-mL scintillation vial was charged with 1.2008 g of methacrylate-terminated polystyrene, 4.6393 g of 2-phenylethyl acrylate (PEA), and 0.1824 g of 1,4-butanediol diacrylate (BDDA). The vial was closed and the mixture was agitated for about 1 hr to allow the polystyrene component to dissolve. The monomer mixture was filtered using a 1.0-micron glass fiber membrane filter, then through a 0.45-micron PTFE membrane filter, and de-gassed by $N_2$ bubbling. 2-Hydroxy-2-methyl-1-phenyl-propane-1-one (Darocur® 1173) was added (0.0580 g) and the solution was mixed thoroughly. The monomer mixture was dispensed into vacuum de-gassed polypropylene molds under a $N_2$ atmosphere. The filled molds were exposed to UV light for 20 min. The product was removed from the polypropylene molds and residual monomer was removed by acetone extraction at room temperature as indicated in Ex. 1. Representative properties are listed in Table 3.

The addition of polystyrene macromer improves the strength properties of soft acrylic polymers allowing increased distortion without fracture. For example, in Table 1, a 2-phenylethyl acrylate-polystyrene methacrylate graft copolymer (Ex. 1) has increased tensile strength, strain at break, tear resistance, and decreased modulus as compared to a statistical copolymer of 2-phenylethylacrylate and styrene of identical monomer feed ratio. Furthermore, the addition of the styrene component results in an increase in the refractive index as compared to all acrylic formulations, permitting the fabrication of smaller mass lenses of identical refractive power.

The molecular weight of the polystyrene macromer also impacts the polymer properties. In Table 2, Ex. 4 contains a higher $M_n$ methacrylate terminated polystyrene, and this results in increased tensile strength and tear resistance with only a moderate increase in modulus as compared to a graft copolymer synthesized with a lower molecular weight methacrylate terminated polystyrene. DSC confirmed the phase-separated morphology in this copolymer (Ex. 4). Further increasing the polystyrene macromer MW resulted in improved tensile properties (Ex. 5), however this copolymer was not optically clear as the phase-separated domains were now large enough to scatter light. Dimethacrylate-terminated polystyrene may also be used with or without additional low molecular weight cross-linker (Table 2, Ex. 6 and 7) to tailor the strain at break.

All of these polymers have excellent clarity as cast. However, the optical clarity following hydration and warming is a function of the cross-linker concentration (Table 3). Copolymers with higher BDDA concentration (Ex. 9, 10) exhibited improved optical clarity when hydrated at 40° C. as compared to lower BDDA concentration (Ex. 8).

EXAMPLE 11

Thermally Initiated Copolymerization of Methacrylate Terminated poly(styrene) with 2-phenylethyl Acrylate, 2-(2-methoxyethoxy)ethyl Methacrylate and 1,4-butanediol Diacrylate A 20-mL scintillation vial is charged with 0.80 g of methacrylate terminated poly(styrene), 2.56 g of 2-phenylethyl acrylate (PEA), 0.60 g of 2-(2-methoxyethoxy)ethyl methacrylate (MEEMA), and 0.04 g of 1,4-butanediol diacrylate (BDDA). The vial is closed and agitated to allow the polystyrene macromonomer to dissolve. The monomer mixture is

TABLE 3

Methacrylate terminated polystyrene copolymers with 2-phenylethyl acrylate and 1,4-butanediol diacrylate

| Example | 8 | 9 | 10 |
|---|---|---|---|
| PEA (wt %) | 79.02 | 78.00 | 77.03 |
| Poly(styrene)MA (wt %) | 19.98 | 19.96 | 19.94 |
| Poly(styrene)MA $M_n$ | 13,000 | 13,000 | 13,000 |
| BDDA (wt %) | 0.99 | 2.04 | 3.03 |
| Initiator | Darocur ® 1173 | Darocur ® 1173 | Darocur ® 1173 |
| Initiator (wt %) | 0.97 | 0.93 | 0.96 |
| Hydrated clarity (22° C.) | clear | clear | clear |
| Hydrated clarity (22° C.) | haze | slight haze | clear |
| Tensile strength (MPa) | 9.27 ± 0.67 | 8.33 ± 0.58 | 7.87 ± 0.38 |
| Strain at break (%) | 750 ± 48 | 420 ± 25 | 279 + 16 |
| Young's modulus | 2.74 ± 0.17 | 3.38 ± 0.16 | 4.96 ± 0.62 |
| 25% modulus | 1.95 ± 0.20 | 2.54 ± 0.43 | 4.18 ± 0.57 |
| 100% modulus | 1.70 + 0.09 | 2.37 ± 0.08 | 3.23 + 0.10 |
| Refractive index (25° C.) | 1.5634 ± 0.0002 | 1.5631 ± 0.0002 | 1.5630 ± 0.0001 | filtered through a 1.0-micron glass fiber membrane. The formulation is de-gassed by bubbling $N_2$ through the monomer mixture. Di(4-tert-butylcyclohexyl)peroxydicarbonate (Perkadox 16S) is added (0.02 g) and the solution is mixed thoroughly. The monomer mixture is dispensed into vacuum de-gassed polypropylene molds under a $N_2$ atmosphere. The filled molds are placed in a 70° C. mechanical convection oven for 1 hr, then post-cured at 110° C. for 2 hrs. The product is removed from the polypropylene molds and any residual monomer is removed by acetone extraction at room temperature. The product polymer is dried under vacuum at 60° C.

These graft copolymers also exhibit a reduced surface tackiness as compared to statistical copolymers of identical feed composition, and this improves the manufacturability and manipulation of IOLs.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

What is claimed is:

1. A polymeric ophthalmic or otorhinolaryngological device material comprising;
   a) a monofunctional acrylate or methacrylate monomer [1];
   b) a difunctional acrylate or methacrylate cross-linking monomer [2]; and
   c) an acrylate or methacrylate terminated polystyrene macromer [3] or a diacrylate or dimethacrylate terminated polystyrene macromer [4];

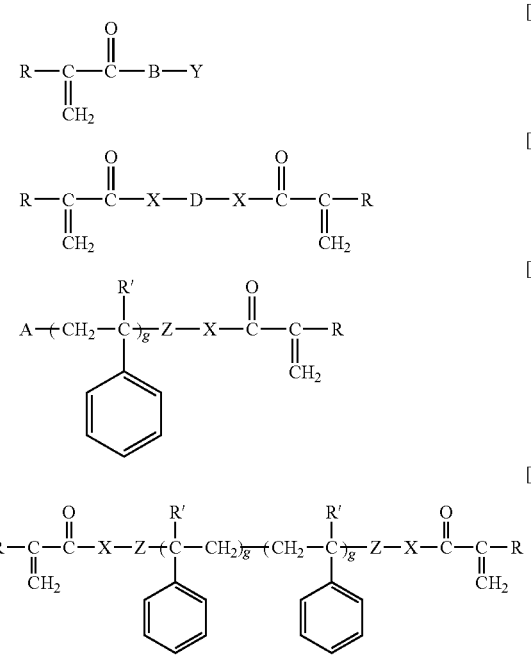

wherein
R, R' independently=H, $CH_3$, or $CH_2CH_3$;
B=$O(CH_2)_n$, $NH(CH_2)_n$, or $NCH_3(CH_2)_n$;
X=$O(CH_2)_n$, $NH(CH_2)_n$, $NCH_3(CH_2)_n$, or nothing;
n=0-6;
Y=phenyl, $(CH_2)_mH$; $(CH_2)_mC_6H_5$, OH, $CH_2CH(OH)$ $CH_2OH$, $(OCH_2CH_2)_mOCH_3$, or $(OCH_2CH_2)_mOCH_2C_3$;
m=0-12;
Z=$(CH_2)_a$, $(CH_2CH_2O)_b$, O, or nothing;
D=$(CH_2)_a$, $O(CH_2CH_2O)_b$, O, or nothing;
a=1-12;
b=1-24;
A=$CH_3$—, $CH_3CH_2$—, $CH_3CH_2CH_2$—, $CH_3CH_2CH_2CH_2$—, or $CH_3CH_2CH(CH_3)$—;
the total amount of monomer of formula (1) is at least 50% (w/w);
the total amount of macromers (3) and/or (4) is 5-40% (w/w); and
styrenic repeat units shown in macromers (3) and/or (4) are sufficiently repeated such that the material exhibits a Young's Modulus less than 6.0 and an elongation of at least 150%; and
an ingredient selected from the group consisting of a polymerizable UV absorber and a polymerizable colorant.

2. The polymeric device material of claim 1 wherein the monomer of formula (1) is selected from the group consisting of those wherein
R=H, B=$O(CH_2)_2$, Y=phenyl; and
R=$CH_3$, B=$O(CH_2)_4$, Y=phenyl.

3. The polymeric device material of claim 1 wherein the monomer of formula (2) is selected from the group consisting of those wherein
R=H, X=$OCH_2$, D=$(CH_2)_2$;
R=$CH_3$, X=$OCH_2$, D=nothing; and
R=$CH_3$, X=nothing, D=$O(CH_2CH_2O)_b$ where b is >10.

4. The polymeric device material of claim 1 wherein the monomer of formula (2) is selected from the group consisting of ethylene glycol dimethacrylate; diethylene glycol dimethacrylate; 1,6-hexanediol dimethacrylate; 1,4-butanediol dimethacrylate; polyethylene oxide)dimethacrylate having a number average molecular weight of 600 to 1000; and their corresponding acrylates.

5. The polymeric device material of claim 1 wherein the macromer of formula (3) is selected from the group consisting of those wherein
R=$CH_3$, R'=H, X=$O(CH_2)_2$, Z=nothing, A=$CH_3CH_2CH(CH_3)$; and
R=$CH_3$, R'=$CH_3$, X=$O(CH_2)_2$, Z=nothing, A=$CH_3CH_2CH(CH_3)$.

6. The polymeric device material of claim 1 wherein the macromer of formula (4) is selected from the group consisting of those wherein:
R=$CH_3$, R'=H, X=$O(CH_2)_2$, Z=nothing, A=$CH_3CH_2CH(CH_3)$; and
R=$CH_3$, R'=$CH_3$, X=$O(CH_2)_2$, Z=nothing, A=$CH_3CH_2CH(CH_3)$.

7. The device material of claim 1 wherein the device material comprises a monomer of formula (1), a monomer of formula (2), a macromer of formula (3), and a macromer of formula (4).

8. The device material of claim 1 wherein the total amount of monomer of formula (1) is 65-85% (w/w).

9. The device material of claim 1 wherein the total amount of the monomer of formula (2) is does not exceed 15% (w/w).

10. The device material of claim 9 wherein the total amount of monomer of formula (2) is less than 3% (w/w).

11. The device material of claim 1 wherein macromer of formula (3) and the macromer of formula (4) have a number average molecular weight less than 51,000.

12. The device material of claim 1 wherein the device material has a refractive index in the dry state of at least 1.47.

13. The device material of claim 1 wherein the device material has a continuous phase glass transition temperature less than 25° C.

14. An ophthalmic or otorhinolaryngological device comprising the device material of claim 1 wherein the ophthalmic or otorhinolaryngological device is selected from the group consisting of intraocular lenses; contact lenses; keratoprostheses; corneal inlays or rings; otological ventilation tubes; and nasal implants.

15. The ophthalmic or otorhinolaryngological device of claim 14 wherein the ophthalmic or otorhinolaryngological device is an intraocular lens.

16. The ophthalmic or otorhinolaryngological device of claim 15 wherein the device material has a continuous phase glass transition temperature less than 25° C.

17. The ophthalmic or otorhinolaryngological device of claim 16 wherein the device material has a refractive index in the dry state of at least 1.47.

* * * * *